July 19, 1966  F. W. OSBORN  3,261,410
VINE HOE

Filed Feb. 13, 1964  2 Sheets-Sheet 1

FORREST W. OSBORN
INVENTOR.

BY

July 19, 1966 F. W. OSBORN 3,261,410
VINE HOE

Filed Feb. 13, 1964 2 Sheets-Sheet 2

Forrest W. Osborn
INVENTOR.

BY

3,261,410
VINE HOE
Forrest W. Osborn, P.O. Box 401, Friona, Tex.
Filed Feb. 13, 1964, Ser. No. 344,619
1 Claim. (Cl. 172—371)

This invention relates to hoes and more particularly to a hoe designed for cutting running, vine-like weeds.

In weeding agricultural fields and gardens, running, vine-like weeds give difficulty. One example of a running vine-like weed is the weed known as "goat head" in southwestern United States although it is known by other names in other parts of the country. Common hoes used for agriculture and gardening include a rod-like gooseneck connecting the flat thin blade portion to the handle. The weeds often wrap themselves around this rod portion causing difficulty to the weeder.

I have designed a hoe that has an integral flat, thin blade portion and gooseneck portion which tapers to the handle.

An object of this invention is to provide a hoe particularly adapted to cutting running, vine-like weeds.

Another object is to provide a hoe adapted to perform all types of weeding and light cultivating practices.

A further object is to provide a hoe which prevents all types of cut weeds from hanging thereon.

Still further objects are to achieve the above with a device that is sturdy, compact, durable, simple, versatile, and reliable, yet inexpensive and easy to manufacture and operate.

The specific nature of the invention as well as other objects and advantages thereof will clearly appear from the following description and from the accompanying drawing, the different views of which are not to the same scale, in which.

Figure 1:
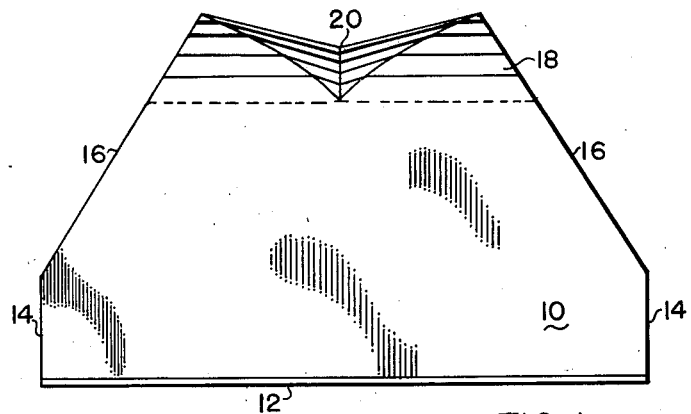
FIG. 1 is a bottom view of a hoe according to this invention taken substantially on line 1—1 of FIG. 2.
Figure 2:
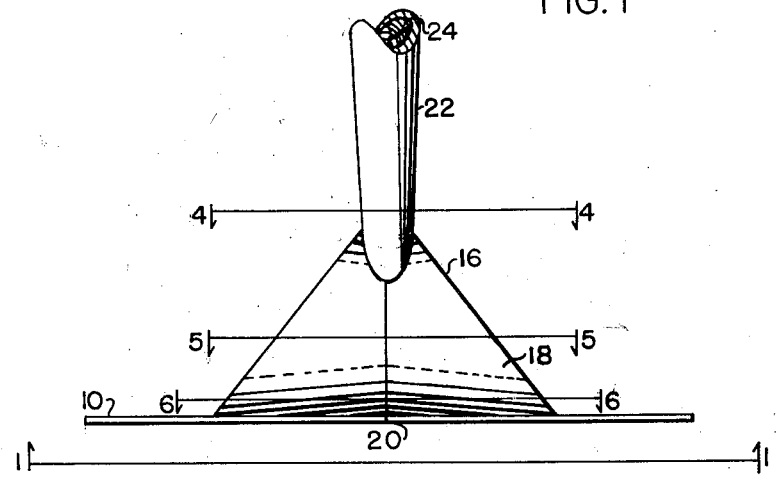
FIG. 2 is a front view of the hoe with the handle and socket broken away.
Figure 3:
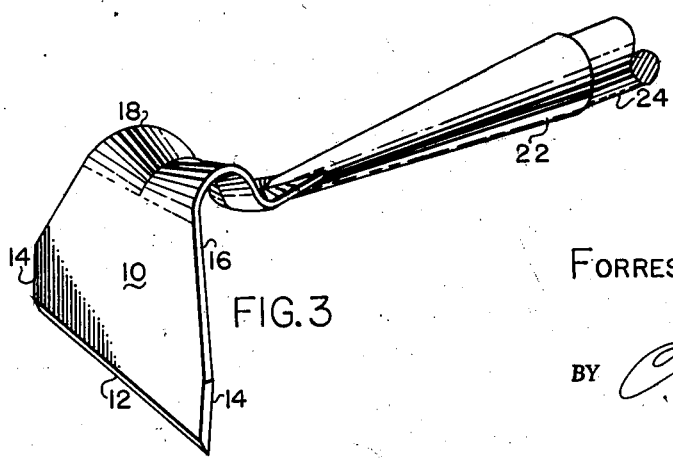
FIG. 3 is a perspective view of the hoe with the handle broken away.
Figure 4:
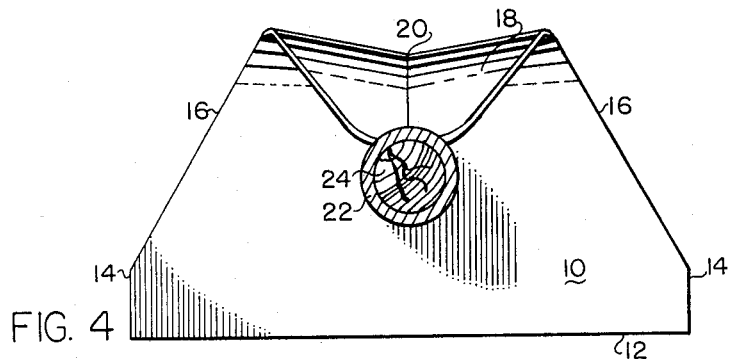
FIG. 4 is a sectional view of the hoe taken on line 4—4 of FIG. 2.
Figure 5:
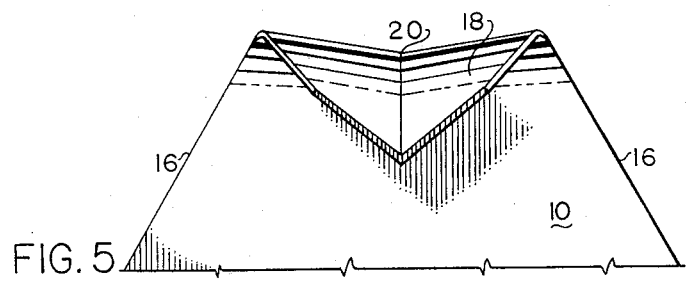
FIG. 5 is a sectional view of the hoe taken on line 5—5 of FIG. 2 with a portion of the blade broken away.
Figure 6:
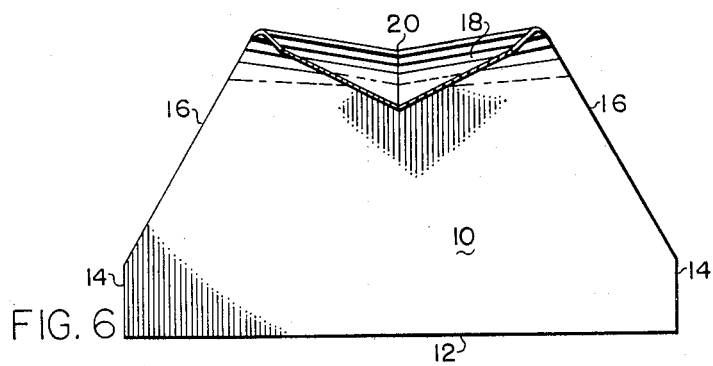
FIG. 6 is a sectional view of the hoe taken on line 6—6 of FIG. 2.

As may be seen from the drawings, the hoe is made from a thin imperforate plate of metal. This plate of metal has a flat blade portion 10. The front edge 12 of the blade is beveled to form a sharp cutting edge. The plate extends with sides 14 at right angles to the front edge 12 for a short distance. Thereafter, the sides taper linearly inwardly at 16, i.e., the sides of the plate at the blade portion 10 taper inwardly to the rear of the cutting edge 12. At the rear of the blade portion 10, the plate is curved upward in the form of a gooseneck. This area is called the gooseneck portion 18. The plate in the gooseneck portion 18 is angled rearward from a median line 20. Therefore, the plate in the gooseneck portion 18 is V-shaped in cross section as more clearly seen in FIGS. 5 and 6. The taper 16 which began at the sides of the blade portion 10 continues to the top of the gooseneck portion 18.

The plate angling backwards to form a V-shaped configuration in cross section is for the purpose of giving additional rigidity in the gooseneck portion 18. In addition, this V-shaped configuration hinders weeds hanging in this area. Also, it will be noted that with the taper 16 weeds cannot hang or be caught on corners of the hoe; inasmuch as there are no interior angles on which they may be caught.

Tapered socket 22 is attached (as by welding) to the top of the gooseneck portion 18. As with all hoes, it is transverse to the blade-like portion 10. The socket 22 forms a means for attaching long wooden handle 24 to the metal portion of the hoe. It may be seen that the tapering sides and the socket form a smooth contour which is free from abrupt shoulders and notches upon which weeds may be caught.

It will be apparent that the embodiment shown is only exemplary and that various modifications can be made in construction, materials, and arrangement within the scope of the invention as defined in the appended claims.

I claim as my invention:

A hoe specially adapted for cutting running, vine-like weeds comprising:
(a) a thin imperforate plate of metal having a portion forming
(b) a flat blade,
(c) the front edge of the blade being straight,
(d) the front edge beveled to form a cutting edge,
(e) the sides of the plate at the blade portion extending for a short distance at right angles to the front edge and tapered linearly inward to the rear of the front edge,
(f) a portion of the plate behind the blade curved upward in the form of a gooseneck,
(g) the taper of the plate beginning at the blade portion being linear and continuing to the top of the gooseneck,
(h) the gooseneck portion angled back on both sides from a median line so that the gooseneck portion is V-shaped in cross section, and
(j) a tapered socket attached to the plate at the top of the gooseneck portion forming means for attaching a long wooden handle to the plate, and
(k) the tapering sides and socket forming a relatively smooth contour, free from abrupt shoulders and notches on which weeds may be caught.

References Cited by the Examiner

UNITED STATES PATENTS

| 394,692 | 12/1888 | Hefner | 172—371 |
| 785,860 | 3/1905 | Choate | 172—371 |
| 876,649 | 1/1908 | Long | 172—381 X |
| 1,515,217 | 11/1924 | Kombol | 172—375 |
| 2,184,217 | 12/1939 | Guynn | 172—371 |

FOREIGN PATENTS

| 909,812 | 1/1946 | France. |
| 664,610 | 8/1938 | Germany. |

ABRAHAM G. STONE, *Primary Examiner.*

F. B. HENRY, *Assistant Examiner.*